United States Patent [19]
Enkegaard

[11] Patent Number: 5,259,876
[45] Date of Patent: Nov. 9, 1993

[54] METHOD AND APPARATUS FOR THE MANUFACTURE OF CLINKER FROM MINERAL RAW MATERIALS

[75] Inventor: Torben Enkegaard, Valby, Denmark
[73] Assignee: F. L. Smidth & Co. A/S, Denmark
[21] Appl. No.: 962,041
[22] Filed: Oct. 15, 1992

Related U.S. Application Data
[63] Continuation of Ser. No. 697,638, May 2, 1991, abandoned.

[30] Foreign Application Priority Data
May 4, 1990 [DK] Denmark .................. 1120/90

[51] Int. Cl.⁵ .................................................. C04B 7/36
[52] U.S. Cl. .................................. 106/761; 106/751; 106/752; 106/762
[58] Field of Search .................. 206/751, 752, 761, 762

[56] References Cited
U.S. PATENT DOCUMENTS

| | | | |
|---|---|---|---|
| 3,622,363 | 11/1971 | Dornick | 106/751 |
| 3,703,275 | 11/1972 | Sylvest | 106/751 |
| 3,784,389 | 1/1974 | Hastrup | 106/752 |
| 3,887,388 | 6/1975 | Christiansen | 106/752 |
| 3,923,536 | 12/1975 | Kobayashi | 106/751 |
| 4,184,886 | 1/1980 | Ellingen et al. | 106/751 |
| 4,576,644 | 3/1986 | Goldmann | 106/752 |
| 4,695,325 | 9/1987 | Enkegaard | 106/751 |
| 4,716,027 | 12/1987 | Morrison | 106/751 |

Primary Examiner—Mark L. Bell
Assistant Examiner—C. M. Bonner
Attorney, Agent, or Firm—Brumbaugh, Graves, Donohue & Raymond

[57] ABSTRACT

In a kiln plant for burning clinker from mineral raw materials, such as cement raw materials, and comprising a kiln (1), a precalciner (4), a preheater (6, 7, 8) and a flue gas filter (31), part of the kiln flue gases is diverted from the precalciner and the preheater via a bypass (20-30), the bypassed amount of flue gas being subjected to a preceding quenching in a chamber (21), humidified with water and cooled in a reactor (23), thereby causing the chlorides and alkalis in the bypassed gas to deposit upon dust particles which together with material dust in the gases are precipitated from the latter in a separator (25). The bypassed flue gas thus being almost purified of harmful compounds is then fed to the filter (31) or recirculated to the bypass in such manner that at least part of the precipitated compounds and material dust from the reactor (23) and the separator (25) is returned to the reactor for renewed treatment in same.

2 Claims, 1 Drawing Sheet

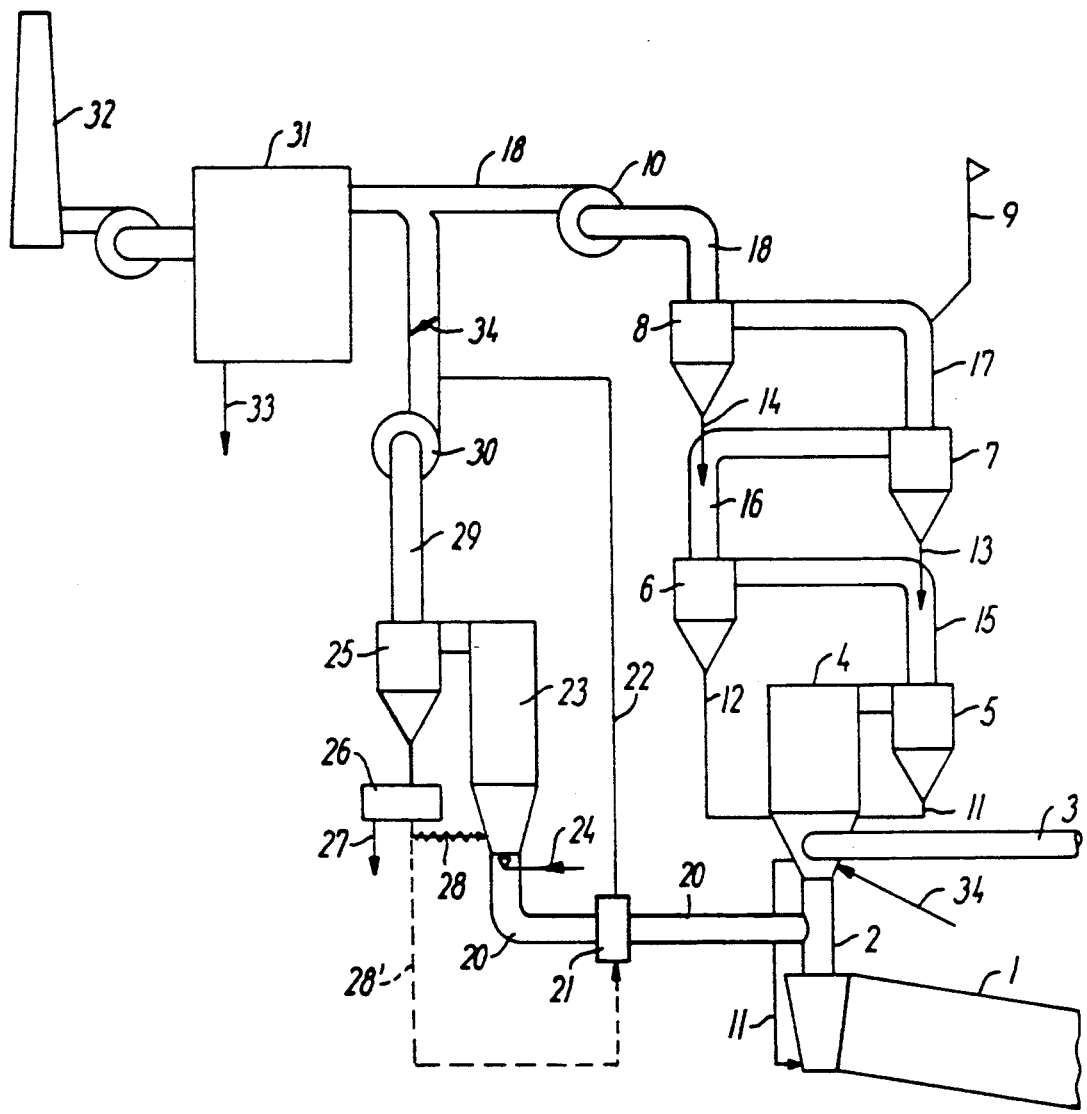

METHOD AND APPARATUS FOR THE MANUFACTURE OF CLINKER FROM MINERAL RAW MATERIALS

This application is a continuation of application Ser. No. 07/697,638, filed on May 2, 1991, now abandoned.

BACKGROUND OF THE INVENTION

The present invention relates to a method and an apparatus for the manufacture of clinker from mineral raw materials, e.g. cement clinker, including substantially removing from the clinker chlorides, sulfur and alkalis (potassium, sodium) in a kiln plant in which the raw materials are preheated, optionally precalcined and then burned and sintered into clinker in the kiln proper, and during which process it is desirable to reduce the contents of harmful compounds, such as chlorides and alkalis, in the manufactured product or to reduce the amount of such compounds circulating in the plant and thereby causing process drawbacks.

U.S. Pat. No. 3,365,521 disclose e.g. a kiln plant for the manufacture of clinker, which plant consists of a rotary kiln having a multistep suspension preheater of the cyclone type and a precalciner coupled before the kiln for expelling $CO_2$ from the treated raw materials and with a cooler coupled after the kiln for cooling the treated product. The raw materials are counter-currently preheated in the suspension preheater by the hot flue gases from the kiln and/or the precalciner, the flue gases thereby being cooled through heat exchange with the raw materials before the gases are directed to a flue gas filter to be purified before being discharged into the atmosphere.

Generally the raw materials used contain varying but often quite considerable amounts of easily evaporating compounds, such as chlorine, sulfur, potassium and sodium, which are harmful to the product proper and to the manufacturing process. In a conventional kiln plant of the above mentioned type such compounds, even though a major part of them evaporate from the clinker during the sintering process, will be recovered in condensing during the passage of the flue gases up through the preheater or the precalciner and then together with the added raw materials be returned to the kiln. Thus, the chloride and alkali content continues to increase during the manufacturing process until a critical value of the precipitated compounds is reached resulting in the risk of said compounds depositing as blockings and bakings in the riser pipes, the precipitator cyclones and the smoke chamber of the kiln.

As also disclosed in the above mentioned U.S. patent specification, the plant may be provided with a bypass to counteract the above mentioned drawbacks so that part of the kiln flue gases is diverted from the preheater and the precalciner and passed into a separate filter. A bypass for 5-10% of the flue gas is normally sufficient to reduce the amount of chlorine compounds or chlorides in the flue gas, while a reduction of the remainder of the volatile components (e.g. sulfur, potassium, sodium) requires a bypass for 30-60% of the amount of flue gas. The bypass according to said patent specification removes chloride from the kiln system by quenching or cooling the bypassed flue gas with air, thereby causing the chlorides to condense and subsequently to precipitate together with material dust contained in the flue gas in a separate bypass filter and then to be removed from the process. However, the method according to the U.S. patent specification suffers from the drawback that such a plant requires two filters, the primary filter and the bypass filter, and that the material dust precipitated in the bypass filter has to be removed completely from the process together with the harmful, uncondensed chlorides without allowing the reuse of the material dust in the process in an economical manner, thereby improving the operating economy of the plant.

GB No. 1,319,180 discloses a kiln plant having a bypass without a separate bypass filter and in which plant the bypassed flue gas is fed directly into the primary filter and purified in same together with the dust-laden flue gas from the preheater. The bypass contains a cyclone precipitator for precipitating larger particles of material with insignificant chloride and alkali content for reuse in the process, whereas all material dust precipitated in the primary filter has to be diverted from the process due to its contents of chlorides and alkalis, the harmful effects of which prevent it from being reused. Thus, the advantage of using one filter only in this type of plant is compensated by the disadvantage in having completely to remove all the dust precipitated in the primary filter from the process.

Danish patent application No. 2483/86 (corresponding to EP application No. 0209961) discloses a bypass installation in a kiln plant having only one filter also, but said bypass being limited to treating only flue gas from burning clinker having a relatively insignificant amount of added chloride (0.015-0.1 weight percent).

Finally, U.S. Pat. Nos. 3,112,764 and 3,288,450 disclose examples of kiln plants provided with a bypass for part of the flue gas, said bypass containing a precipitator cyclone for precipitating alkalis from the flue gas, the filter dust from the filter of the kiln plant being directed to the precipitator cyclone of the bypass as a coolant causing the alkali vapours in this cyclone to condense upon the dust particles which are subsequently precipitated and discharged completely from the process. The method according to these patent specifications implies the condensation of the alkalis upon the dust particles at a temperature of 500°-700° C., the cooling obtained by means of recirculated filter dust or by adding other fine-grained material being relatively insignificant. Thus, in practice it will prove difficult to obtain a sufficient cut size of the precipitator cyclone through this method to ensure an effective alkali purification of the smoke.

Therefore, it is the object of the invention to provide a method and an apparatus for an improved treatment of bypass flue gas from a kiln plant to remedy the above mentioned drawbacks, and which allow the reuse of precipitated dust both from the primary filter of the plant and from the treatment of the bypass flue gas.

SUMMARY OF THE INVENTION

This object is obtained in a method for the manufacture of clinker from mineral raw materials, e.g. cement clinker, including substantially removing chlorides, sulfur and alkalis (potassium, sodium) from the clinker in a kiln plant which—as viewed in the flow direction of the raw materials—consists of a suspension preheater optionally a precalciner for expelling $CO_2$ from the raw materials, a kiln for burning and sintering the raw materials and a cooler for cooling the product treated in the kiln, and which plant is further provided with a flue gas bypass having a quenching or mixing chamber for the treatment of the bypassed amount of flue gas, and where both the amount of flue gas discharged through the preheater and the bypassed amount of flue gas are fed to one and the same flue gas cleaning filter of the plant and which is characterized in that the bypassed amount of flue gas with its contents of chlorides, sulfur and alkalis is subjected to a treatment at about 150° C. in a reactor of the gas suspension-absorption type with injection of water near the bottom of the reactor so that the wet particles formed through the preceding quenching in the reactor upon their surfaces dissolve the alkalis and the salts and then through the evaporation of the water in the reactor form salt and dust particles, which particles are precipitated in the reactor flue gas, and in that the major part of these salt/dust particles are precipitated from the flue gas in a separator coupled after the reactor, the particles being recirculated from this separator to the bypass reactor for renewed treatment in the latter and/or for discharge from the plant.

A particularly preferred embodiment of the method is characterized in that part of the flue gas which is purified and cooled in the bypass after having passed the bypass separator is recirculated to the quenching step of the bypass as cooling air for the bypass flue gas from the kiln.

Furthermore, the object is obtained by means of an apparatus for carrying out the method comprising a bypass for treating the bypassed amount of flue gas in a kiln plant for the manufacture of clinker from mineral raw materials and having a quenching or mixing chamber, and characterized in that the bypass further comprises a reactor of the gas suspension-absorption type and designed as a cylindrical vessel having a conical bottom with a central inlet therein for kiln flue gas, at least one water injection nozzle mounted near the bottom of the reactor, a separator coupled immediately after the reactor for precipitating dust particles from the flue gas treated in the reactor, means for recirculating part of the dust particles precipitated in the separator to the reactor or to the mixing chamber, and means for conveying the flue gas purified in the reactor and the separator to the flue gas filter of the kiln plant, and in that the apparatus also has means for recirculating cooled, purified bypass flue gas as cooling air to the mixing chamber.

The present invention is particularly advantageous in that the bypassed flue gas is humidified during its treatment in a bypass reactor, e.g. of the gas suspension-absorption type, enabling by way of a large issue of moistened particles and using the surfaces of these particles to make chlorides and alkalis to deposit upon these particles and to be transported together with them up through the reactor, the alkalis and the salts thus being dissolved on the wet particle surfaces and then through the evaporation of the water in the reactor at a reactor temperature of about 150° C. to precipitate as salt or dust particles in the reactor flue gas. The particles are then precipitated from the flue gas in the subsequent separator so as to reduce the risk of deposits upon and hence blockings of or backings in adjacent plant parts.

The material dust precipitated from the bypass reactor may be recirculated to same before being discharged from the process. 90-95% of the chlorides and alkalis contained in the bypassd flue gas are precipitated in the bypass, the bypassed flue gas which is then fed to the primary filter of the plant being thus almost completely purified of harmful compounds which makes it possible to reuse in the kiln system proper all material dust precipitated in the primary filter, said dust being added to the preheater in a known way together with added raw materials. Furthermore, the filter installation of a kiln plant constituting an essential part of the total plant investments may due to the present flue gas purification requirements and operating and control equipment therefore be reduced to a single filter, namely the primary filter.

The inevitably larger total calorie consumption of the plant using a bypass according to the invention is compensated partly by a more profitable end product due to the better quality of the latter (low alkali content), partly by the reduction of the risk of plant stops due to blockings of exposed parts of the plant.

BRIEF DESCRIPTION OF THE DRAWING

The invention will be explained in further detail in the following with reference to the drawing which diagrammatically and without being limiting illustrates an example of a rotary kiln plant having a precalciner and a onestringed suspension preheater and being provided with a bypass installation according to the invention.

DESCRIPTION OF THE PREFERRED EMBODIMENT

Raw materials are fed into the plant at 9, preheated countercurrently by flue gas from a rotary kiln 1 in a cyclone preheater consisting of cyclones 6, 7 and 8 and appertaining riser pipes 15, 16 and 17 and material ducts 12, 13 and 14, precalcined in a suspension precalciner 4, precipitated from the flue gas in a cyclone separator 5 and directed to the kiln 1 as preheated and precalcined raw material via a duct 11. Combustion air is conveyed to the precalciner 4 partly as kiln flue gas via a kiln riser pipe 2, partly as spent cooler air via a duct 3 from a material cooler (not shown) coupled after the kiln 1. Fuel is fed into the precalciner at 34. The kiln and precalciner flue gases are drawn up through the preheater by a fan 10 and conveyed through the duct 18 to a filter 31, e.g. an electrofilter, in which the flue gases are purified of entrained material dust which is discharged through an outlet 33 and optionally via homogenizing bins (not shown) recirculated to the kiln plant for renewed treatment in same together with the raw materials introduced at 9. Purified flue gas is discharged into the atmosphere from the filter 31 via a fan and a stack 32. The kiln riser pipe 2 is provided with a bypass installation 20-30 for diverting part of the kiln flue gas from the precalciner and preheater to the filter 31. After quenching by means of recirculated, cooled bypass dust introduced via a conveyer 28 and by means of recirculated, cooled flue gas introduced via a duct 22 to a quenching or mixing chamber 21 mounted in the bypass duct 20, the flue gas is conveyed to a cylindrical reactor 23 having a conical bottom with a central inlet therein for flue gas. Simultaneously with the feeding of flue gas into the reactor 23 water is injected into same through a nozzle 24 in or near the bottom of the reactor. Quenching by means of recirculating cooled dust and flue gas causes salts, including chlorides, in the flue gas to condense and solidify, thereby removing their sticking effect prior to the treatment in the reactor 23, and the introduction of water through the nozzle 24 causes a dispersion of the water upon the dust particles and hence an evaporation of the water in the reactor from same particles, thereby further reducing the flue gas temperature in the reactor down to about 150° C. The salts and the dust particles introduced with the flue gas are caught upon the surfaces of the moistened recirculated dust particles, thereby causing said particles to grow in size and be transported up through the reactor 23 on evaporation of the water. These particles are then precipitated from the flue gas in a separator 25 coupled after the reactor 23, and from the separator 25 the precipitated particles are then fed into a bin 26 to be returned to the reactor 23 either via the conveyor 28 or to the mixing chamber 21 via a duct 28', or to be discharged from the process via an outlet 27. On the effect from a fan 30 purified by pass smoke gas is transported through a duct 29 to the filter 31 for a final purification of the last fine residue of material dust together with the purification of the flue gas from the preheater. By means of a throttle valve 34 in the duct 29 and via the duct 22 part of the purified, cooled bypass flue gas may be recirculated to the mixing chamber 21 to be used as coolant in the latter for the bypassed flue gas from the kiln 1.

Calculations have shown that the increase in the running costs of a bypass installation plant according to the invention is modest in that the increase is mainly due to an additional electric power consumption for the fan 30, and that the pressure loss over the reactor 23 and the separator 25 may be limited to 100–200 mmWC which is only slightly more than the pressure loss over a conventional cooling tower being replaced according to the invention by these parts of the bypass installation.

It will be understood by those skilled in the art that various changes in form and detail may be made in the preferred embodiment of the invention without departing from its spirit and scope.

The embodiment of the invention in which an exclusive property or privilege is claimed as defined as follows:

1. A method of manufacturing clinker from mineral raw materials in a kiln comprising the steps of
   (1) preheating the mineral raw material in a suspension preheater by passing a first portion of hot flue gas from the kiln countercurrent to the material in the preheater, and then passing said first portion from the preheater to a flue gas cleaning filter;
   (2) passing the preheated mineral raw material from the preheater to the kiln and burning the preheated raw material in the kiln to form clinker;
   (3) bypassing a second portion of the hot flue gas from the kiln to a quenching chamber, cooling said second portion in said quenching chamber, by introducing into said chamber recirculated, cooled bypass flue gas, so as to cause chlorides, sulfur and alkalis contained in said second portion to condense and solidify;
   (4) passing the bypassed second portion, together with its contents of condensed or solidified chlorides, sulfur or alkalis as a material-gas suspension, upwardly through a gas suspension-absorption reactor, and treating said suspension in said reactor by injecting water and recirculated dust particles into a lower portion of the reactor thereby causing the chlorides, sulfur and alkalis to be dissolved in the water and the water to be dispersed on the dust particles, and thereafter passing the suspension upwardly through the reactor thereby causing the water to evaporate from the dust particles;
   (5) removing the suspension together with the dust particles from the reactor and separating the dust particles from the gas of the second portion in a bypass separator;
   (6) recirculating at least a portion of the dust particles to said reactor in step (4); and
   (7) passing the remainder of the material-gas suspension from said second portion to said flue gas cleaning filter, without passing said remainder to a separate bypass filter, to be cleaned in same together with said first portion and passing the thus cleaned gas portions into the atmosphere.

2. A method according to claim 1 wherein the second portion is treated in the reactor at a temperature of about 150° C.

* * * * *